July 18, 1967 W. JACKSON 3,331,475
POSITIVE CENTERING BRAKE ASSEMBLY
Filed March 21, 1966

INVENTOR.
WOODROW JACKSON
BY
John H. Widdowson
ATTORNEY

— # United States Patent Office 3,331,475
Patented July 18, 1967

3,331,475
POSITIVE CENTERING BRAKE ASSEMBLY
Woodrow Jackson, 715 S. Everett, Wichita, Kans. 67213
Filed Mar. 21, 1966, Ser. No. 535,829
3 Claims. (Cl. 188—78)

This invention relates to a new and novel brake assembly, and more particularly, this invention relates to an apparatus for positively centering brake shoes used in a conventional brake assembly. Still more specifically, this invention relates to a centering apparatus used in a brake assembly on vehicles to positively return the actuated brake shoes to the inactive or retracted position.

Many types of brake assemblies are known to the prior art which act on an expanding hydraulically actuated brake shoe principle with tension springs used to return the brake shoes to the retracted positions. However, all the prior art devices are subject to contact between the backing plate and the brake shoes thereby providing a frictional drag between the brake shoes and brake drum resulting in unnecessary, uneven wear on the brake lining. Additionally, none of the prior art devices function to positively center the brake shoes but rather rely solely on standard tension springs which are subject to fatigue so as become ineffective as a centering means.

In accordance with the present invention, a new positive centering apparatus for an otherwise substantially standard brake assembly is provided. The brake assembly has a backing plate secured to the basic frame of a conventional automotive-type wheel assembly. A drive shaft or axle rotatably mounted within the backing plate has the outer end thereof secured to an angular brake drum. Mounted within the drum is a brake actuating mechanism having a pair of brake shoes movable to an expanded or braking position against the drum by a hydraulic piston actuated through a master cylinder by a brake pedal. The lower ends of brake shoes are pivotally connected to an adjustment bar secured to a backing plate whereby the brake shoes are adjustable to compensate for brake lining wear in the conventional manner. The brake shoes are urged towards a retracted position by tension springs connected to the backing plate and each respective brake shoe.

The centering apparatus of this invention includes bolt members extended through pairs of aligned holes in the backing plate and in each of the brake shoes. A compression spring is mounted about each bolt member to resiliently bias the brake shoes from the braking position to the retracted position. Additionally, a second spring member is connected to each bolt member to maintain the brake shoes out of contact with the backing plate for unrestricted free movement of the brake shoes to the retracted positions.

Accordingly, it is an object of this invention to provide a new and novel brake assembly.

Another object of this invention is to provide a novel and positive centering apparatus for a brake assembly.

A further object of this invention is to provide a positive centering apparatus for a brake assembly having spring members connected to a bolt member operable to bias the brake shoes to the inactive or retracted positions.

A still further object of this invention is to provide a centering apparatus readily attachable to presently available conventional brake assemblies.

One other object of this invention is to provide a centering apparatus for a brake assembly that is simple to install, substantially maintenance free, and economical to manufacture.

Various other objects, advantages, and features of the invention will become apparent to those skilled in the art from the following discussion taken in conjunction with the accompanying drawings, in which.

Figure 1:
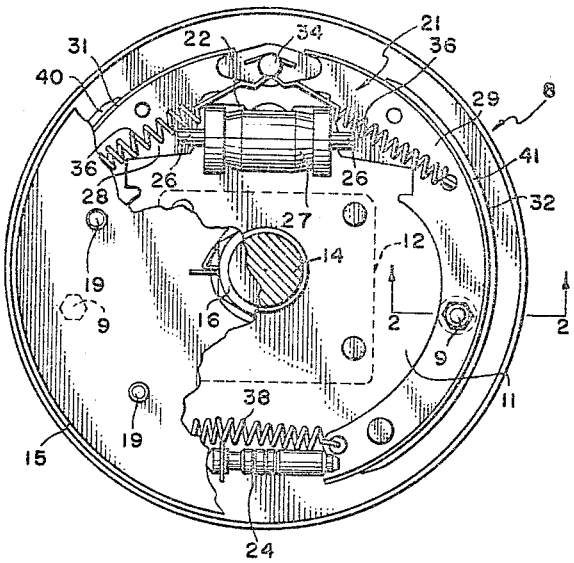
FIG. 1 is an elevational view of a brake assembly illustrating the novel centering apparatus of this invention.

The following is a discussion and description of preferred specific embodiments of the new centering apparatus of this invention, such being made with reference to the drawings, whereupon the same reference numerals are used to indicate the same or similar parts and/or structure. It is to be understood that such discussions and descriptions are not to unduly limit the scope of the invention.

Referring to the drawings and particularly to FIG. 1, a conventional brake assembly is indicated generally at 8 embodying a pair of the centering apparatus of this invention designated by the numeral 9. The brake assembly 8 has a backing plate 11 secured to a thrust or bearing plate 12 which in turn is connected to the wheel assembly (not shown) of an automobile or a similar vehicle. A drive shaft or wheel axle 14 extends transversely of the backing plate 11 and is rotatably carried in the bearing plate 12. An annular brake drum 15 is secured as by a large thrust nut 16 to the outer end of the wheel axle 14 and positioned so as to rotate adjacent the backing plate 11. A tire or the like is secured to the brake drum 15 as by bolts 19 so as to support the vehicle load carried through the wheel axle 14 in a conventional manner while permitting rotation of the tire for vehicle movement.

Mounted within the brake drum 15 and connected to the backing plate 11 is a brake actuating mechanism 21 having a hydraulic piston structure 22 and an adjusting bar 24 secured in opposed relationship to the outwardly facing side of the backing plate 11. The piston structure 22 has piston rods 26 extended outwardly of a hydraulic housing 27 engageable, respectively, with the upper ends of web portions 28 and 29 of diametrically opposed brake shoes 31 and 32. The lower ends of the web portions 28 and 29 are mounted within opposed slots in the adjusting bar 24. Mounted above the hydraulic piston structure 22 is a lug 34 secured to the backing plate 11 to which is connected one end of retraction springs 36 having their opposite ends secured to the brake shoes 31 and 32, respectively. A third retraction spring 38 is interconnected between the opposed adjacent lower ends of the brake shoes 31 and 32 next to the adjusting bar 24.

The brake actuator mechanism 21 as presently described is operable to pivot the brake shoes 31 and 32 outwardly about their lower ends on outward movement of the piston rods 26. These rods 26 are axially movable under fluid pressure on depression of a brake pedal (not shown) in a conventional manner. This results in contact with brake linings 40 and 41 mounted on outer rim portions 43 of the brake shoes 31 and 32, respectively, contacting the inner surfaces of the brake drum 15 to retard and stop the rotational movement of the axle 14. Subsequently, on release of the brake pedal, the retraction springs 36 and 38 coact to bias the brake shoes 31 and 32 inwardly to the inactive or retracted positions. However, in normal operation, the brake shoes 31 and 32 frequently bind against the backing plate 11 and results in an unnecessary drag and wear on the brake linings 40 and 41. The centering apparatus 9 of this invention assures proper return of the brake shoes 31 and 32 to the retracted positions.

Figure 2:
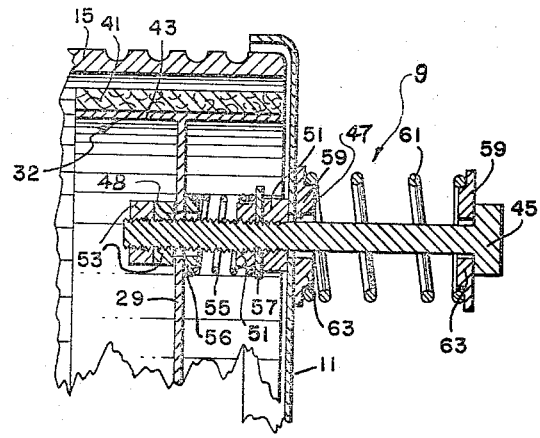
FIG. 2 is an enlarged fragmentary sectional view taken along the line 2—2 in FIG. 1 illustrating a centering apparatus of this invention.

As shown in FIG. 2, each centering apparatus 9 includes an elongated shaft or bolt member 45 extended through axially aligned and holes 47 and 48 in the backing plate 11 and the corresponding web portions 28 or 29. A pair of lock nuts 51 are threaded on the bolt member 45 and positioned against the outwardly facing surface of the backing plate 11 to prevent axial movement of the bolt member 45 inwardly therefrom. A second pair of retainer nuts 53 are threaded on the outer end of the bolt member 45 against one surface of the corresponding web portions 28 or 29. A first compression spring 55 is mounted about the bolt member 45 having one end in contact with a washer 56 against the surfaces of the corresponding web portions 28 or 29 and the other end contacts a washer 57 held between the lock nuts 51. It is seen that the first compression spring 55 resiliently holds the upper portion of the rim portion 43 spaced from the backing plate 11 and the adjustability of the retainer nuts 53 permits regulation of the spacing therebetween.

On the other side of the backing plate 11 is mounted a pair of washers 59 positioned about the bolt member 45 and having a second compression spring 61 connected therebetween. The washers 59 have stepped central facing portions 63 adapted to support the contacting ends of the second compression spring 61 and prevents lateral movement therefrom. It is seen that the second compression spring 61 resiliently restricts axial movement of the bolt member 45 in the opposite direction (outwardly) and operates to maintain the bolt member 45 in a position normal to the backing plate 11.

Figure 3:
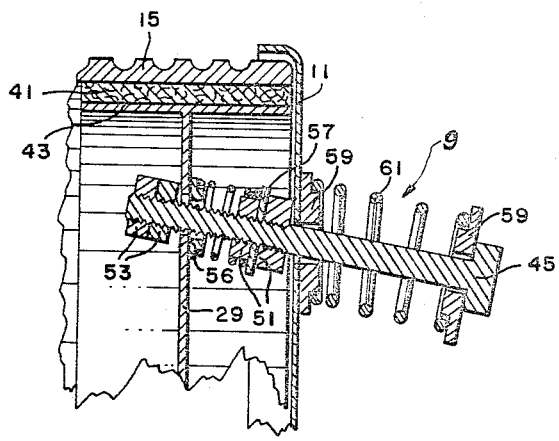
FIG. 3 is a view similar to FIG. 2 illustrating the centering apparatus and a brake shoe of this invention in an actuated position.

In the use and operation of the brake assembly 8 with the centering apparatus 9 of this invention, the brake pedal is actuated to move the brake shoes 31 and 32 outwardly into frictional contact with the brake drum 15 as shown in FIG. 3. In this position, the bolt members 45 and the large second compression spring 61 are tilted which results in a larger force on the inner portion thereof relative to the outer portion toward the brake drum 15. This unbalance of forces results in a tendency for the bolt members 45 to rotate counterclockwise, as viewed in FIG. 3, to the neutral position of FIG. 2. The tilting of the bolt members 45 causes contact between opposed sides of the backing plate 11 and the corresponding web portions 28 or 29 to result in a turning force regulated by the strength of the second compression springs 61. The smaller first compression springs 55 also aid in movement of the bolt members 45 to the upright or normal position. Therefore, it is seen that the centering apparatus 19 operates to return the brake shoes 31 and 32 to the inactive or retracted positions.

The brake assembly has been described with a pair of opposed centering apparatus, however, any number of such units may be used as necessary. Additionally, the centering apparatus of this invention can be used without the retainer springs to return the brake shoes to the inactive or retracted positions. As will be apparent from the foregoing descriptions of the preferred embodiments of the applicant's novel brake assembly, a relatively simple and inexpensive centering apparatus has been provided which is readily attachable to conventional brake assemblies so as to provide an inexpensive means for positively returning the brake shoes to their retracted positions. Applicant's construction results in a great deal of savings on the wear and tear of the brake linings of the brake shoes and is easy and economical to install, maintain, and manufacture.

While the invention has been described in connection with preferred specific embodiments thereof, it will be understood that this description is intended to illustrate and not to limit the scope of the invention, which is defined by the following claims.

I claim:
1. A brake mechanism comprising:
 (a) a support means having a backing member,
 (b) drive shaft means rotatably connected to said backing member,
 (c) a brake member secured to said drive shaft means for conjoint movement therewith,
 (d) a brake shoe pivotally connected to said support means,
 (e) means connected to said support means and said brake shoe operable to selectively move said brake shoe from a retracted position to a second braking position engaging said brake member, and
 (f) centering means connected to said backing member having a bolt member extended through aligned openings in said backing member and said brake shoe, a first retaining member secured to one end portion of said bolt member to prevent axial movement thereof in one direction, a first resilient means mounted about said bolt member engageable with said backing member and the other end portion of said bolt member to resiliently restrict axial movement thereof in the opposite direction, and a second resilient means mounted about said bolt member positioned between said backing member and said brake shoe to resiliently position said brake shoe outwardly of said backing member whereby movement of said brake shoe to a braking position results in unbalanced resiliency of said first and second resilient means to urge said shoe to the retracted position.

2. A brake mechanism as claimed in claim 1, including:
 (a) a second retaining member mounted on said bolt member engageable with said backing member and said second resilient means whereby said first and second resilient means are adjustable on said bolt member to position said brake shoe relative to said backing member and to regulate the resilient force on said first and second resilient means to aid in urging said brake shoe to a retracted position.

3. A brake mechanism as claimed in claim 1, including:
 (a) a pair of washer members having indented central portions engageable with opposite ends of said first resilient means whereby said first resilient means is maintained centered relative to said bolt member thereby assuring unbalanced resiliency of said first resilient means on tilting movement of said bolt member to urge said brake shoe to a retracted position.

References Cited
UNITED STATES PATENTS 1,712,855 5/1929 Thorne.
2,111,297 3/1938 Pontius.
2,999,566 9/1961 Naudzius.

MILTON BUCHLER, *Primary Examiner.*

B. S. MOWRY, *Assistant Examiner.*